I. B. DOLLEY.
Trap for Catching Birds.
No. 234,004.   Patented Nov. 2, 1880.
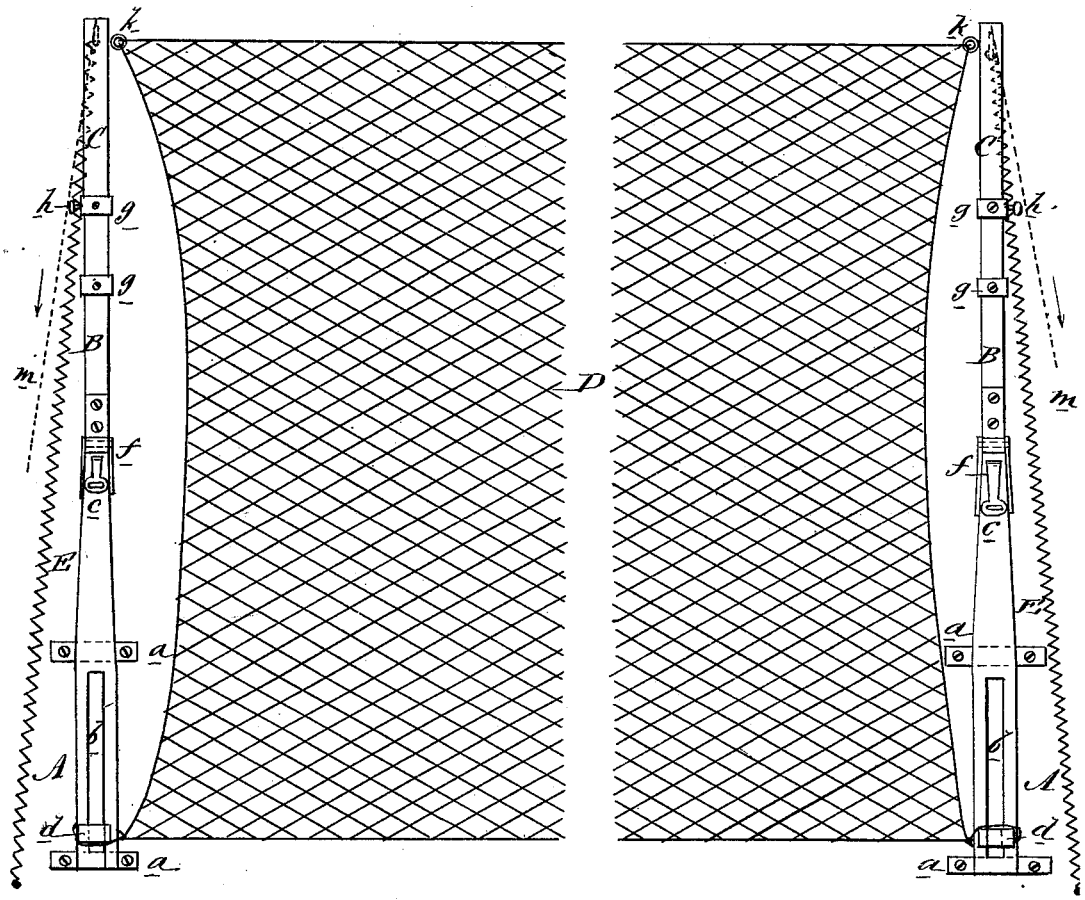
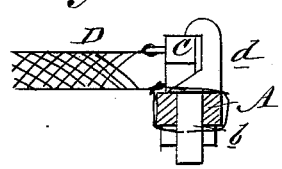
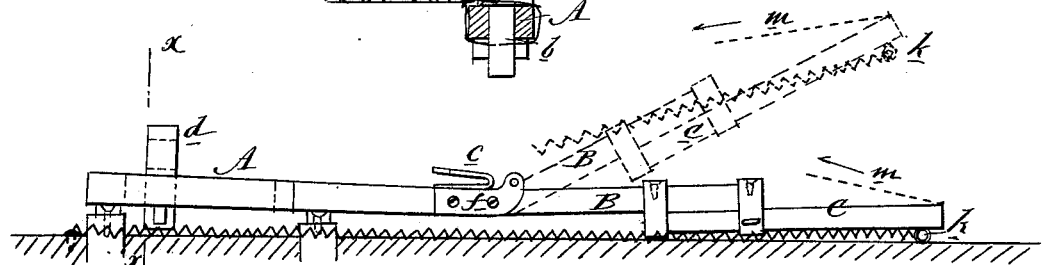
WITNESSES:
C. Neveux
C. Sedgwick
INVENTOR:
I. B. Dolley
BY Munn & Co.
ATTORNEYS.

UNITED STATES PATENT OFFICE.

IZATES B. DOLLEY, OF PORT ALLEGHENY, PENNSYLVANIA.

TRAP FOR CATCHING BIRDS.

SPECIFICATION forming part of Letters Patent No. 234,004, dated November 2, 1880.

Application filed February 26, 1880.

*To all whom it may concern:*

Be it known that I, IZATES B. DOLLEY, of Port Allegheny, in the county of McKean and State of Pennsylvania, have invented a new and Improved Bird-Net, of which the following is a specification.

Figure 1 is a plan of the net set in position. Fig. 2 is a side elevation of the same. Fig. 3 is a sectional elevation on line $x\,x$, Fig. 2.

Similar letters of reference indicate corresponding parts.

The object of this invention is to provide a quick-acting and effective net to be fixed on the ground for the purpose of entrapping birds.

The invention consists of two jointed extension side-stretchers, of wood or other suitable material, that hold a netting between them, and are operated by springs to throw a portion of the net over the birds to be caught.

In the drawings, A A represent the fixed ends of the stretchers, that are to be secured to the ground by means of their cross bars $a\,a$. Said stretcher ends are longitudinally slotted, as shown at $b$, and have fastened on their upper faces, near their hinged ends, the V-springs $c$, and in the said slots $b$ are secured the sliding clamps $d$, whose function is to aid in stretching the netting to its proper tension and to hold the extension ends of the stretchers when the net is sprung.

Hinged to the fixed end sections, A A, by the hinges $f$ are the central sections, B B, of the stretchers, on which central sections are fixed the metallic bands $g$, that hold and guide the extensible sections C C of the said stretchers, said sections C C being longitudinally adjustable, and being held in the desired position by the thumb-screws $h\,h$, that pass through one of the bands $g$ on each central stretcher-section. In the inner faces of these extensible sections C C, and near their extreme ends, are fixed the screw-eyes $k\,k$ or other suitable device, to which are fastened the front corners of the netting D, while the rear corners of said netting D are secured to the sliding clamps $d$, or to the fixed ends A A of the stretchers.

The rubber or spiral springs E E, that operate to spring or close the net, are attached to the extreme ends of the sections C C.

When the device is in the position shown in the drawings, with the stretchers set apart to stretch the netting D sufficiently and extended on the surface of the ground, the springs E E are drawn to their extreme tension, and their free ends are fastened to the ground by pins or other suitable devices, as shown. In this position the net is set, and a pull upon the cords $m$ in the direction of the arrows elevates the extreme ends of the sections C C to such an angle, as shown in dotted lines, Fig. 2, that the springs E E operate to suddenly spring and close the whole portion of the net down upon the birds that are on the ground or flying over the folded net, so as to entrap and hold any birds that may be upon the ground; and in order to hold the net in this closed position the extreme ends of the sections C C are engaged under the sliding clamps $d\,d$, as shown in Fig. 3 of the drawings, and held there by the action of the V-springs $c$.

In some cases the extensible sections C C may be dispensed with, and also the bands $g\,g$ that hold it, in which case the springs E E would be attached to the hinged section.

Having thus described my invention, I claim as new and desire to secure by Letters Patent—

1. In a bird-net, a stretcher constructed substantially as herein shown and described, consisting of a slotted fixed section, A, provided with clamp $d$ and a central hinged section, B, as set forth.

2. In a bird-net, the combination, with the stretchers, of the V-spring $c$ and clamp $d$, substantially as herein shown and described, whereby the net is held closed, as set forth.

IZATES B. DOLLEY.

Witnesses:
P. A. McDONALD,
L. H. DOLLEY.